US012643098B2

(12) United States Patent
Tan et al.

(10) Patent No.: US 12,643,098 B2
(45) Date of Patent: Jun. 2, 2026

(54) FERROMAGNETIC ROTORS FOR AGITATING THE LIQUID IN A MICROWELL

(71) Applicant: Access Medical Systems, Ltd., Palo Alto, CA (US)

(72) Inventors: Hong Tan, San Jose, CA (US); Haode Chen, Shanghai (CN); Genqian Li, Shanghai (CN)

(73) Assignee: ACCESS MEDICAL SYSTEMS, LTD., Palo Alto, CA (US)

( * ) Notice: Subject to any disclaimer, the term of this patent is extended or adjusted under 35 U.S.C. 154(b) by 160 days.

(21) Appl. No.: 18/517,999

(22) Filed: Nov. 22, 2023

(65) Prior Publication Data

US 2024/0082836 A1 Mar. 14, 2024

Related U.S. Application Data

(63) Continuation-in-part of application No. 16/810,545, filed on Mar. 5, 2020, now abandoned, which is a continuation of application No. PCT/US2018/049591, filed on Sep. 5, 2018.

(60) Provisional application No. 62/554,962, filed on Sep. 6, 2017.

(51) Int. Cl.
*B01F 33/452* (2022.01)
*B01L 3/00* (2006.01)

(52) U.S. Cl.
CPC ...... *B01L 3/502715* (2013.01); *B01F 33/452* (2022.01); *B01L 2300/0663* (2013.01); *B01L 2300/0861* (2013.01); *B01L 2400/043* (2013.01)

(58) Field of Classification Search
CPC ..................... B01F 33/452
USPC ..................... 366/273, 274
See application file for complete search history.

(56) References Cited

U.S. PATENT DOCUMENTS

| | | | |
|---|---|---|---|
| 1,242,493 | A | 10/1917 | Stringham |
| 2,641,452 | A | 6/1953 | Wagner |
| 3,304,449 | A | 2/1967 | Pohlman |
| 3,481,586 | A | 12/1969 | Roberts |

(Continued)

FOREIGN PATENT DOCUMENTS

| | | |
|---|---|---|
| CN | 103913491 A | 7/2014 |
| CN | 104165793 A | 11/2014 |

(Continued)

OTHER PUBLICATIONS

Extended European Search Report for European Patent Application No. 18854365.6. Mailing Date: Apr. 20, 2021.

(Continued)

*Primary Examiner* — David L Sorkin
(74) *Attorney, Agent, or Firm* — PERKINS COIE LLP; Viola T. Kung; Andrew T. Pettit

(57) ABSTRACT

Introduced here are rotors that can be placed inside of microplate wells that include liquid samples. Each rotor can be comprised of a ferromagnetic material. Accordingly, when a rotor is subjected to an external rotational magnetic field, the rotor spins and agitates the liquid sample inside the corresponding well. The spin speed may be adjusted by changing the rotation speed, direction, and/or orientation of the external rotational magnetic field. The rotor typically includes a central cavity within which a probe can be suspended during the biochemical test.

17 Claims, 6 Drawing Sheets

Rotating Magnetic Field 306

(56) References Cited

U.S. PATENT DOCUMENTS

| | | | | |
|---|---|---|---|---|
| 3,689,033 | A | 9/1972 | Holmstrom et al. | |
| 3,694,115 | A | 9/1972 | Steingroever | |
| 4,858,759 | A | 8/1989 | Mauthe et al. | |
| 5,989,178 | A | 11/1999 | Chiu | |
| 6,100,618 | A | 8/2000 | Schoeb et al. | |
| 2002/0181323 | A1 | 12/2002 | Stogsdill | |
| 2003/0157721 | A1 | 8/2003 | Turner et al. | |
| 2007/0019502 | A1 * | 1/2007 | Foley | B01F 29/31 366/273 |
| 2007/0263484 | A1 | 11/2007 | Terentiev | |
| 2007/0297950 | A1 | 12/2007 | Hochstrasser et al. | |
| 2010/0046323 | A1 | 2/2010 | Tien et al. | |
| 2016/0175789 | A1 | 6/2016 | Shima et al. | |
| 2018/0326383 | A1 * | 11/2018 | Kotani | B01L 3/00 |
| 2020/0197887 | A1 * | 6/2020 | Tan | B01F 27/1142 |

FOREIGN PATENT DOCUMENTS

| | | | |
|---|---|---|---|
| CN | 104246500 | A | 12/2014 |
| DE | 102015000704 | B3 | 1/2016 |
| EP | 1161988 | A2 | 12/2001 |
| JP | 2014130032 | A | 7/2014 |

OTHER PUBLICATIONS

International Search Report for PCT Application No. PCT/US2018/049591. Mailing Date: Jan. 11, 2019.

Himmelsbach et al. "Mixing Systems" Design and Scale Up Chemical Engineering, Apr. 1, 2016, vol. 113, No. 4, pp. 46-53.

Jaquith "Technical Information about BRAND plates Standard Microplates" Mar. 27, 2014. Retrieved from the internet: https://www.wellplate.com/96-well-plate-dimensions/. 5 pages.

* cited by examiner

FERROMAGNETIC ROTORS FOR AGITATING THE LIQUID IN A MICROWELL

CROSS-REFERENCE TO RELATED APPLICATIONS

This application is a continuation-in-part of U.S. application Ser. No. 16/810,545, filed on Mar. 5, 2020, which is a continuation of International Application No. PCT/US2018/049591, filed on Sep. 5, 2018, which claims priority to U.S. Provisional Application No. 62/554,962, filed on Sep. 6, 2017, each of which is incorporated herein by reference in its entirety.

FIELD OF THE INVENTION

Various embodiments pertain to equipment for biochemical testing and, more specifically, ferromagnetic rotors able to agitate the liquid sample in a microwell, such as a microplate well or a test cartridge well.

BACKGROUND

In the development of biochemical testing systems (e.g., immunoassay systems), many performance requirements need to be met. Assays need to be sensitive enough to detect an analyte at very low levels in the sub-picogram to nanogram per milliliter range. Moreover, total assay time often needs to be 15 minutes or less in order to provide timely results for patients in point-of-care situations, or to meet throughput requirements for batch analyzers.

Analyte panels able to simultaneously perform multiple assays with a single sample are advantageous because they minimize the turnaround time for results and the costs of testing. Microplates that have multiple wells for holding separate liquid samples are also advantageous because they enable multiple liquid samples to be tested simultaneously or sequentially in quick succession. However, there exists a need for biochemical testing equipment able to more effectively and efficiently agitate the liquid samples within the wells of a microplate.

BRIEF DESCRIPTION OF THE DRAWINGS

Various objects, features, and characteristics of the technology will become apparent to those skilled in the art from a study of the Detailed Description in conjunction with the drawings.

Figure 1:
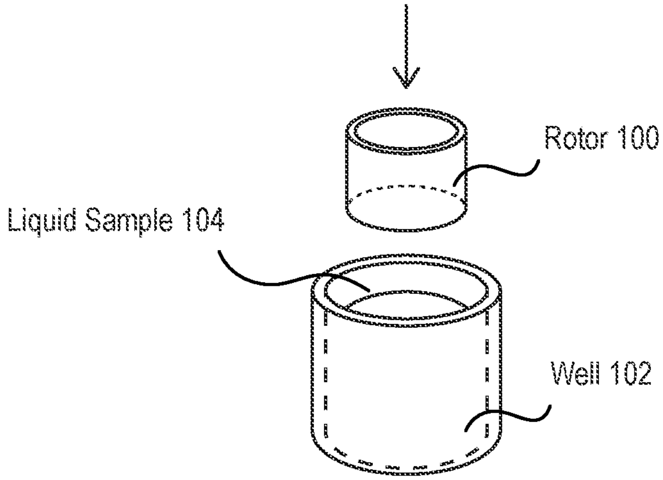
FIG. 1 depicts a cylindrical rotor that can be placed inside of a well that includes a liquid sample.

The drawings depict various embodiments described throughout the Detailed Description for the purpose of illustration only. While specific embodiments have been shown by way of example, the technology is amenable to various modifications and alternative forms. The intention is not to limit the technology to the particular embodiments illustrated and/or described.

DETAILED DESCRIPTION

Introduced here are rotors that can be placed inside of a microwell that includes a liquid sample (e.g., a biological sample). "Microwells," as used herein, refer to wells having a small inner diameter, for example, no more than 50 mm, preferably no more than 30 mm, no more than 20 mm, or no more than 10 mm. In one embodiment, microwells have a size of 2-50 mm, 2-20 mm, or 2-10 mm. The microwell may be one of multiple wells included on a microplate. The rotor can be subjected to an external rotational magnetic field, which causes the rotor to spin. Such action will agitate the liquid sample inside the well. Thus, a microwell that includes a rotor may be referred to as a "whirlpool well."

Whirlpool wells can be used for conducting biochemical tests, such as enzyme-linked immunosorbent assays (ELISAs) and probe-based tests (e.g., those offered by ForteBio Octet and ET Healthcare Pylon). The term "probe", as used herein, may be used to refer to a substrate coated with analyte-binding molecules at the sensing side. Additionally or alternatively, whirlpool wells can be used for reconstituting and/or mixing of reagents before, during, or after the testing process.

Rotors designed for installation within a well will be often in the form of annular cylinders having an open central cavity. Thus, the rotor can be designed to include a central cavity within which a probe can be suspended during a biochemical test. Moreover, the rotor may be designed so that the rotor can spin within the well without excessive horizontal movement. Excessive horizontal movement may cause the rotor to come into contact with the probe, which could damage the testing equipment and/or affect the reliability of the test results. While embodiments may be described in the context of cylindrical rotors, those skilled in the art will recognize that the rotors need not necessarily be cylindrical.

Rotor spin characteristics can be modified by changing the rotation speed, direction, and/or orientation of the external rotational magnetic field. For example, the speed at which a rotor spins may be adjusted by changing the rotation speed of the external rotational magnetic field.

Such a design provides several advantages over the magnetic beads and magnetic bars that have conventionally been used in combination with microwells. For example, the rotors described herein can create sufficient agitation to more effectively prevent undesirable rebinding of components and disturb the mass transport layer that often forms along the top of liquid samples. Increased turbulence can also improve dissociation of components, improve the binding reaction, etc.

Moreover, because the rotors are normally comprised of a ferromagnetic material, the rotors can be controlled using an external magnetic field. Since no invasive mechanisms are needed to cause movement of the rotors, a cover can be placed over the corresponding well. While the cover may include a single aperture through which a probe can be extended, the cover can prevent the evaporation of liquid samples (which plagues some sensitive biochemical tests).

Further yet, several rotors introduced here include a substantially cylindrical body having a central cavity with an open top end and/or an open bottom end. These ferromagnetic rotors permit greater flexibility in biochemical testing. For example, such a design allows testing equipment to generate readings based on imaging light emitted through the bottom of the well (e.g., by a laser). Such measurements cannot be made when magnetic bead(s) or magnetic bar(s) sit upon the bottom of the well, thereby causing reflection of the imaging light.

Terminology

Brief definitions of terms, abbreviations, and phrases used throughout the application are given below.

The term "probe" refers to a monolithic substrate having as aspect ratio (length-to-width) of at least 2 to 1 with analyte-binding molecules coated on the sensing side.

The term "monolithic substrate" refers to a solid piece of material having a uniform composition, such as glass, quartz, or plastic, with one refractive index.

The term "analyte-binding molecule" refers to any molecule capable of participating in a binding reaction with an analyte molecule. Examples of analyte-binding molecules include, but are not limited to, (i) antigen molecules, for use in detecting the presence of antibodies specific against that antigen; (ii) antibody molecules, for use in detecting the presence of antigens; (iii) protein molecules, for use in detecting the presence of a binding partner for that protein; (iv) ligands, for use in detecting the presence of a binding partner; and (v) single-stranded nucleic acid molecules, for use in detecting the presence of nucleic acid molecules.

The terms "connected," "coupled," or any variant thereof means any connection or coupling, either direct or indirect, between two or more components. The connection or coupling between the components can be physical and/or logical. For example, two components could be coupled directly to one another or via intermediary channel(s) or component(s).

The term "about" means within ±10% of the recited value.

System Topology Overview

FIG. 1 depicts a cylindrical rotor 100 that can be placed inside of a well 102 that includes a liquid sample 104. The liquid sample 104 may be, for example, a biological sample having an analyte. The cylindrical rotor 100 can be comprised of a ferromagnetic material, such as cobalt, iron, a ferromagnetic alloy, a plastic ferromagnetic composite material, etc. The cylindrical rotor 100 may be comprised of a combination of such materials. In some embodiments, the cylindrical rotor 100 also includes one or more non-ferromagnetic materials (e.g., plastic, glass, or rubber). For example, the cylindrical rotor 100 may include a coating (e.g., comprised of silicon rubber) that inhibits exposure of the ferromagnetic material(s) to the liquid sample 104.

Figure 2:
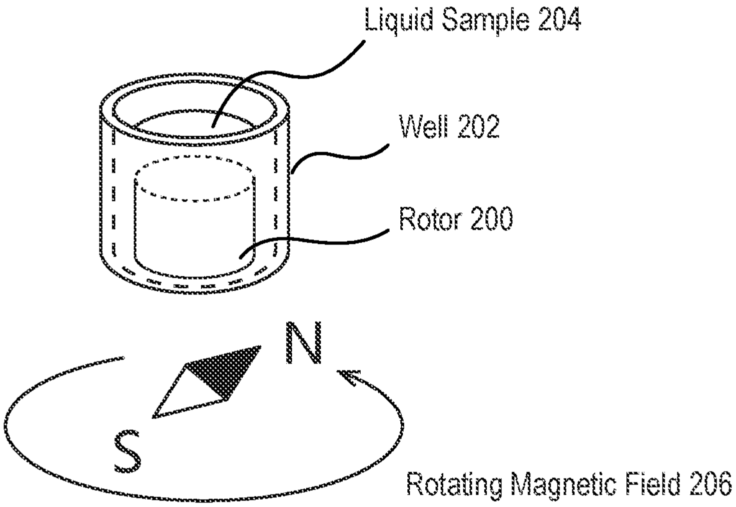
FIG. 2 illustrates how a cylindrical rotor can be subjected to an external rotational magnetic field when placed within a well that includes a liquid sample.

FIG. 2 illustrates how a cylindrical rotor 200 can be subjected to an external rotational magnetic field 206 when placed within a well 202 that includes a liquid sample 204. The external rotational magnetic field 206 causes the cylindrical rotor 200 to spin, which agitates the liquid sample 204 inside the well 202. Such action may occur during a biochemical test, such as enzyme-linked immunosorbent assays (ELISAs) and probe-based tests (e.g., those offered by ForteBio Octet and ET Healthcare Pylon). For example, the cylindrical rotor 200 may be used to facilitate the reconstituting and/or mixing of reagents before, during, or after the testing process.

Rotor spin characteristics can be modified by changing the rotation speed, direction, and/or orientation of the external rotational magnetic field 206. For example, the speed at which the rotor 200 spins may be adjusted by changing the rotation speed of the external rotational magnetic field 206.

The external rotational magnetic field 206 can be created by a magnetized material and/or moving electric charges (i.e., electric currents). Rotating magnetic fields are a key principle in a variety of conventional technologies, including alternating-current motors. To produce the external rotational magnetic field 206, a permanent magnet (not shown) may be rotated so as to maintain its alignment with the external rotational magnetic field 206.

The external rotational magnetic field 206 may be produced by a three-phase system where the three currents are roughly equal in magnitude and have 120 degrees phase different. In such embodiments, three similar coils having mutual geometrical angles of 120 degrees can create the external rotational magnetic field 206. As shown in FIG. 2, by placing these coils underneath the well 202, the cylindrical rotor 200 may be driven in a particular direction (i.e., either clockwise or counterclockwise). Those skilled in the art will recognize that a variety of different technologies may be used to produce a rotating magnetic field whose operating characteristics can be controllably varied.

A rotating or alternating magnetic field can be created proximate to the well 202 (and thus the cylindrical rotor 200) by rotating one or more permanent magnets. For example, the permanent magnet(s) may be located beneath the well 202 to avoid interfering with a biochemical test that requires a probe be inserted through the opening of the well 202. Alternatively, a rotating or alternating magnetic field can be created through the use of electric coils similar to an electric motor.

Figure 3:
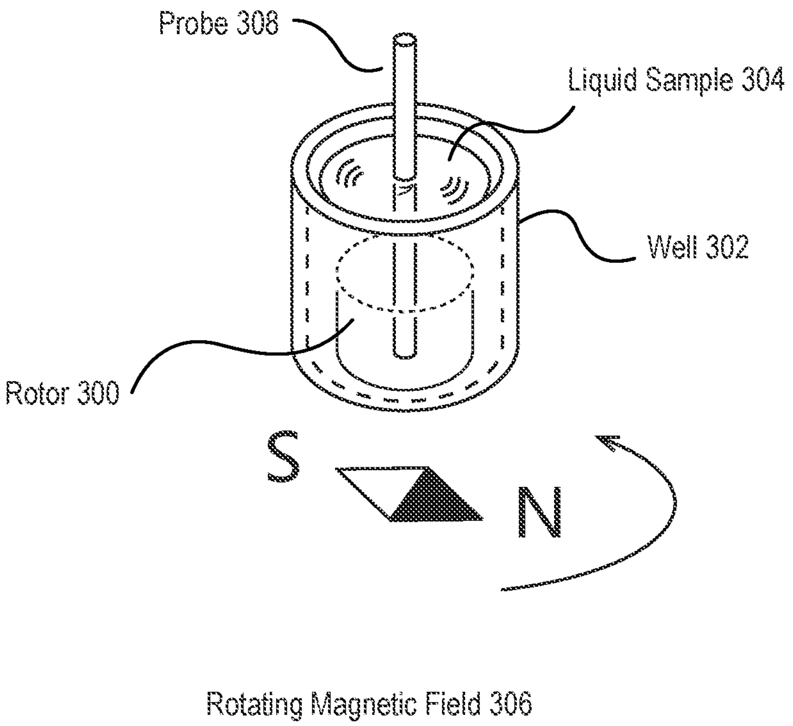
FIG. 3 shows how, upon subjecting a cylindrical rotor to an external rotational magnetic field, the cylindrical rotor spins and agitates the liquid sample inside the well.

FIG. 3 shows how, upon subjecting a cylindrical rotor 300 to an external rotational magnetic field 306, the cylindrical rotor 300 spins and agitates the liquid sample 304 inside the well 302. As further described below, the rotor 300 need not necessarily be cylindrical. However, the rotor 300 is typically designed so that it includes a central cavity.

During a biochemical test, a probe 308 can be suspended within the central cavity. Examples of probe-based detection technologies are described in U.S. Pat. No. 8,309,369, titled "Detection System and Method for High Sensitivity Fluorescent Assays," and U.S. Pat. No. 8,753,574, titled "Systems for Immunoassay Tests," each of which is incorporated by reference herein in its entirety. Such a design ensures that the probe 308 does not lose its binding affinity and is not harmed by the cylindrical rotor 300 as the cylindrical rotor 300 spins within the well 302. Accordingly, when the cylindrical rotor 300 is placed into a well, an axis defined through the central cavity may be orthogonal to the surface of the liquid sample 304 such that the open top end of the cylindrical rotor 300 is proximate to the opening of the well.

The cylindrical rotor 300 may be partially or fully immersed in a liquid sample 304 when placed within a well 302. Thus, in some embodiments the cylindrical rotor 300 will be partially exposed above a surface of the liquid sample 304, while in other embodiments the cylindrical rotor 300 will be fully submerged beneath the surface of the liquid sample 304. The cylindrical rotor 300 may have a height of no more than 200 millimeters (mm), preferably no more than 100 mm, no more than 75 mm, no more than 50 mm, or no more than 25 mm. In one embodiments, the cylindrical rotor 300 has a height of 5-200 mm, 5-100 mm, 5-75 mm, 5-50 mm, 5-25 mm, or 5-10 mm. In some embodiments, the height of the cylindrical rotor 300 is based on the depth of the well 302. For example, the depth of the well 302 may be at least 10% larger, or at least 25% larger, or at least 50% larger than the height of the cylindrical rotor 300. Thus, the height of the cylindrical rotor may be 5-9.1 mm fora 10 mm deep microwell, 7.5-13.6 mm for a 15 mm deep microwell, 10-18.2 mm for a 20 mm deep microwell, etc.

Figure 4:
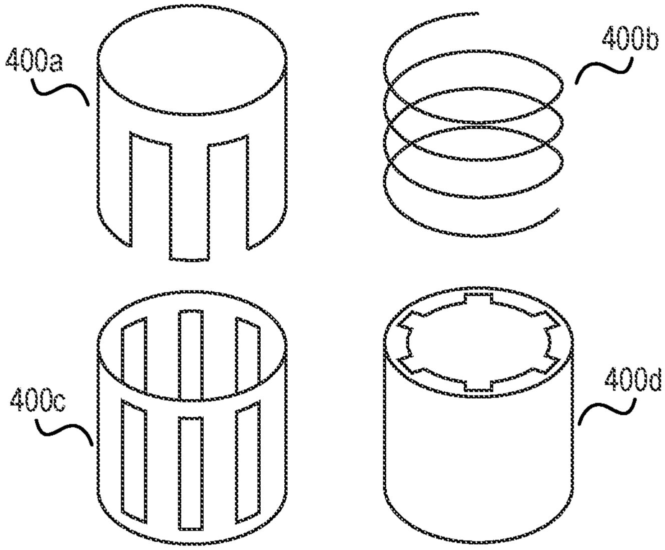
FIG. 4 depicts several different examples of rotors.

Embodiments have been described in the context of cylindrical rotors for the purpose of illustration only. Those skilled in the art will recognize that a rotor could be other shapes as well. FIG. 4 depicts several different examples of rotors 400*a-d*. Generally, the rotor can be made in different shapes so long as the rotor does not come into contact with the probe (or any other testing equipment) as the rotor spins within the well.

Here, for example, several different designs having central cavities are shown. A first rotor 400*a* includes a cylindrical structural body having a series of teeth that extend downward toward an open bottom end. A second rotor 400*b* includes a cylindrical structural body formed from a material that is molded into a shape roughly similar to a spring. A third rotor 400*c* includes a cylindrical structural body having a series of apertures in the sidewall that expose the central cavity. A fourth rotor 400*d* includes a cylindrical structural body having a solid sidewall. While the first, second, and third rotors 400*a-c* have elliptical (e.g., circular) inner diameters, the fourth rotor 400 includes a non-elliptical inner diameter. Here, for example, the inner diameter of the fourth rotor 400 is a gear-like shape.

These rotor 400*a-d* may create different levels of agitation. For example, the second rotor 400*b* (also referred to as the "spring-shaped rotor" or "spiral-shaped rotor") may create the most agitation. In some embodiments, the structural body of the rotor includes one or more flow interfaces. The flow interface(s) extend from an outer wall to an inner wall defining the central cavity. The flow interface(s) enable liquid to flow into and out of the central cavity. In some embodiments, the boundaries of the flow interface(s) are completely defined, as can be seen with respect to rotor 400*c*. In other embodiments, the boundaries of the flow interface(s) are partially defined, as can be seen with respect to rotor 400*a*.

A rotor can include a substantially cylindrical body that is comprised of a ferromagnetic material. The substantially cylindrical body can include an outer wall and an inner wall disposed circumferentially around a central cavity. The substantially cylindrical body also includes an open top end through which probes can extend. In some embodiments the substantially cylindrical body includes an open bottom end, while in other embodiments the substantially cylindrical body includes a closed bottom end.

The outer wall of the rotor will typically have a diameter slightly smaller than the inner diameter of the well. Such a design ensures that the rotor can spin within the well without excessive horizontal movement. Excessive horizontal movement may cause the rotor to come into contact with the probe, which could damage the testing equipment and/or affect the reliability of the test results.

In some embodiments, the central cavity is defined by a tapered inner wall that narrows toward either the top end or the bottom end. Thus, the central cavity may decrease in width along the length of the rotor to guide flow in a particular manner (e.g., upward toward the surface of the liquid sample or downward toward the bottom of the well).

Generally, the rotor does not extend above the liquid sample in the well because such exposure will create additional friction. Thus, enough liquid will generally be deposited into the well to entirely cover the rotor, though the height of the rotor may be about the same as the depth of the liquid sample in the well. Accordingly, the height of the rotor is often less than the depth of the liquid sample in the well, but the height of the rotor may be designed to be substantially similar to the depth of the liquid sample. Such an approach to designing the rotor has an important effect as agitation will occur throughout the liquid column formed by the liquid sample. Consider, for example, magnetic stirring rods (also called "magnetic stirrers") that have traditionally been used to mix liquids in biochemical tests. When a rotating magnetic field is applied to a magnetic stirrer, the magnetic stirrer will rotate. However, because the magnetic stirrer "sits" on the bottom of the well, agitation can result in a whirlpool effect, where the fluid is drawn downward more strongly near the center of the well, causing a void to be formed near the center of the well—generally near the opening of the well. If a probe is to be suspended into the well as discussed above with reference to FIG. 3, the whirlpool effect is problematic for several reasons. First, the end of the probe could be located within the void itself, and therefore may not consistently be in contact with the sample. Second, the end of the probe will be located where the sample experienced the most turbidity, which may result in inconclusive or improper results. Moreover, magnetic stirrers are largely, if not entirely, impractical for biochemical tests where light is to be shone through the bottom of the well since magnetic stirrers "sit" along the bottom of the well.

Figure 5:
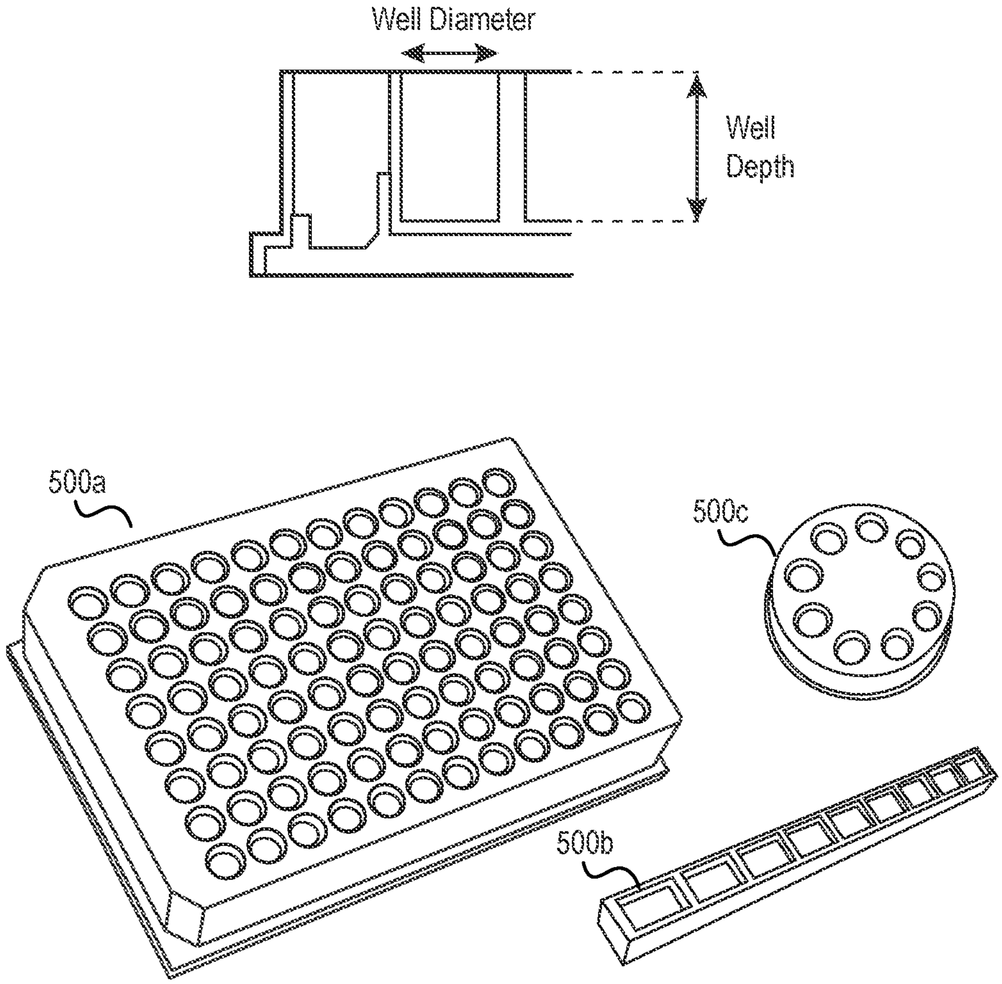
FIG. 5 depicts several different plates having microwells (also referred to more simply as "wells").

FIG. 5 depicts several different microplates (or simply "plates") having flat surfaces with microwells (or simply "wells") defined therein. At a high level, a plate is a rigid structure that includes one or more wells defined therein, generally along a flat surface that faces upward when the rigid structure is placed on an underlying surface. These wells serve as small test tubes in a sense, allowing liquid to be deposited therein (e.g., for analysis purposes).

In FIG. 5, three examples of plates are shown, namely, a first plate 500*a* that has a plurality of wells arranged in a rectangular matrix, a second plate 500*b* that has a single linear array of wells, and a third plate 500*c* that has a single circular array of wells. Note that the number of wells shown in FIG. 5 is not intended to be limiting. For example, the first plate 500*a* may be representative of a traditional microplate that has 6, 12, 24, 48, 96, or 384 wells arranged in a 2:3 rectangular matrix. Similarly, the second plate 500*b* and third plate 500*c* could include tens or hundreds of wells.

Wells can have various shapes. For example, the opening of the well that is formed in the surface of the place can be round, square, polygon, etc. Moreover, different well shapes can be mixed in a group or an array. For example, the first plate 500*a* that has a 96-well format may include rows of round wells and rows of square wells. The shape and size of a well may affect the design of the rotor to be placed within the well. For example, to account for the differences in how liquid flows within round and square wells, an individual may need to install rotors of a first shape in round wells and rotors of a second shape in square wells.

The dimensions of the wells can also vary. As shown in FIG. 5, wells are commonly characterized using two parameters, namely, diameter and depth.

The diameter of each well is usually no more than 20 mm, though the diameter could be greater than 20 mm in some embodiments. For example, each well may have a diameter of 3.6 mm, 5.0 mm, 7.2 mm, 10.0 mm, 14.0 mm, or 20.0 mm. The diameter of the rotor, meanwhile, is typically at least 5% smaller, or at least 10% smaller, or at least 25% smaller than the diameter of the well in which the rotor is to be placed. Accordingly, the diameter of the rotor may be about 7.5-9.5 mm for a 10 mm diameter microwell, 10-13.3 mm for a 14 mm diameter microwell, 15-19 mm for a 20 mm microwell, etc. The diameter of the rotor may be 1-45 mm.

Similarly, the depth of each well is usually no more than 20 mm, though the depth could be greater than 20 mm in some embodiments. For example, each well may have a depth of 5.0 mm, 9.0 mm, 10.0 mm, 10.7 mm, 11.7 mm, 16.1 mm, or 20.0 mm. The depth of the well may be at least 10% larger, or at least 25% larger, or at least 50% larger than the height of the rotor. Thus, the height of the rotor may be about 5.0-9.0 mm for a 10 mm deep microwell, 7.5-13.5 mm fora 15 mm deep microwell, 10.0-18.0 mm for a 20 mm deep microwell, etc.

Each well typically has a volume somewhere between tens of nanoliters and several milliliters. Normally, wells are used to store liquid, at least temporarily, that is used before, during, or after a biochemical test. However, wells could also be used to store dry power. Those skilled in the art will recognize that the actual volume of a given well will depend on its diameter and depth, as well as its shape.

Wells—and more specifically, their layout along the surface of the plate—can also be characterized using parameters such as edge offset (i.e., the distance between a given plate edge and the nearest well), spacing (i.e., the distance from the center of one well to the center of an adjacent well), etc. However, those parameters generally have less impact on functionality of the rotor, and therefore may be varied based on convenience, intended application, and the like.

Any number of the wells on a plate could include rotors during a biochemical test. In some embodiments, each well on a plate includes a rotor. In such embodiments, when the plate is subjected to a rotating magnetic field, agitation may occur in each well. In other embodiments, only a subset of the wells include a rotor. Consider, for example, the first plate 500*a* shown in FIG. 5. As part of a biochemical test, samples—associated with the same patient or different patients—may be loaded into the leftmost column of wells, rotors may be loaded into the leftmost column of cells, and probes may be suspended within the rotors as discussed above with reference to FIG. 3. When the plate is subjected to a rotating magnetic field, agitation may only occur in the leftmost column of wells. The other wells may include reagents, buffers, and the like that are necessary for the biochemical test.

While embodiments may be described in the context of microplates, rotor(s) may also be installed within the well(s) of a test cartridge. A test cartridge can include a plurality of wet wells, a measurement well that includes a light-transmissive bottom, a probe well, a protective cap designed to enclose an upper end of a probe that extends above the probe well. Examples of test cartridges are described in U.S. Pat. No. 8,753,574, titled "Systems for Immunoassay Tests," and U.S. Pat. No. 9,616,427, titled "Cartridge Assembly Tray for Immunoassay Tests," each of which is incorporated by reference herein in its entirety.

Figure 6:
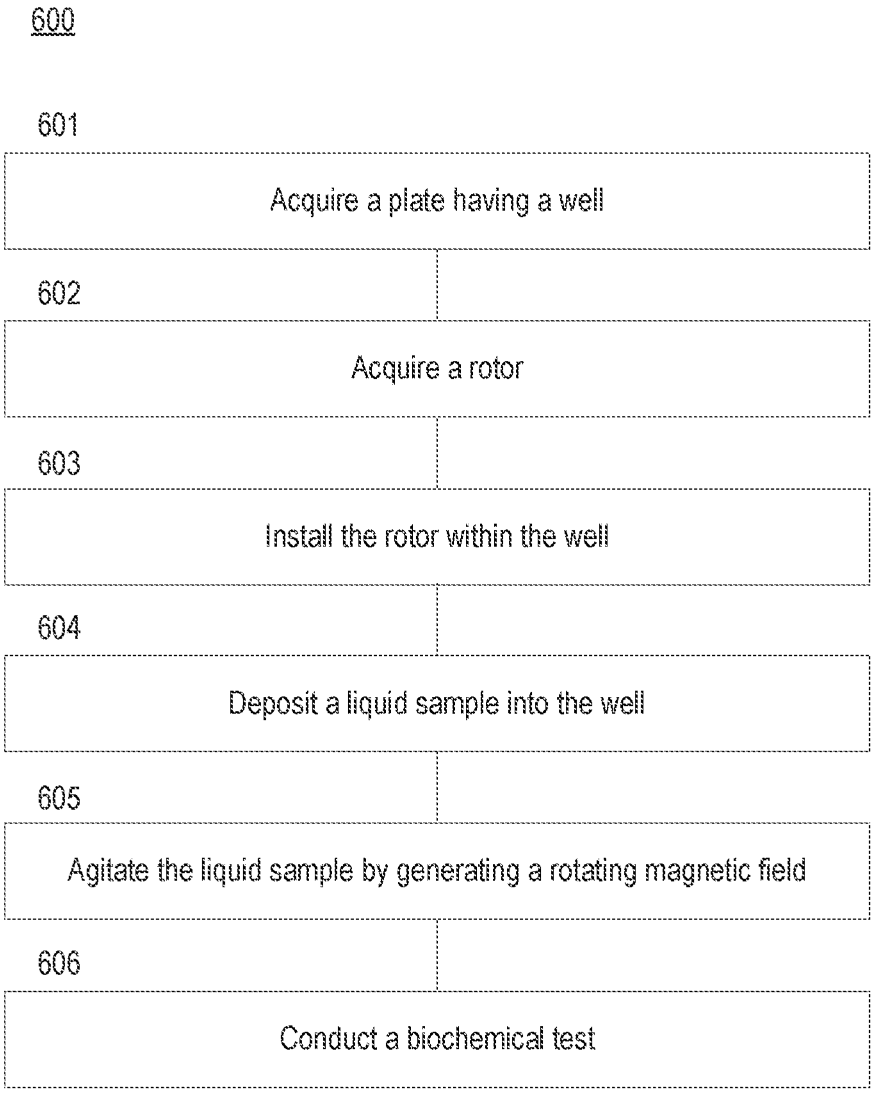
FIG. 6 includes a flow diagram of a process for causing a liquid sample in a well to be agitated by a cylindrical rotor.

FIG. 6 includes a flow diagram of a process 600 for causing a liquid sample in a well to be agitated by a cylindrical rotor. Initially, an individual acquires a plate having a well (step 601). The individual may be, for example, a person involved in biochemical testing. The individual also acquires a rotor to be installed within the well (step 602). The rotor can include a substantially cylindrical body having a central cavity with an open top end and/or an open bottom end. Moreover, the rotor can be comprised of a ferromagnetic material.

The individual can then install the rotor within the well (step 603). For example, the individual may place the rotor within the well using her hands or another instrument (e.g., an antimicrobial tweezers). Thereafter, the individual can deposit a liquid sample into the well (step 604). In some embodiments the liquid sample is manually injected into the well, while in other embodiments the liquid sample is automatically injected into the well (e.g., by an automatic injection machine).

After depositing the liquid sample into the well, the individual can cause the liquid sample to be agitated by generating a rotating magnetic field (step 605). For example, the individual may interact with a mechanism (e.g., a mechanical button of a probe-based detection system or an interface element shown on a display of the probe-based detection system) to initiate the generation of the rotating magnetic field. Thus, the individual may be able to manually control whether the rotor is rotating, as well as characteristics of the movement (e.g., rotation speed). In other embodiments, the probe-based detection system automatically controls whether the rotor is rotating. For example, the probe-based detection system may be configured to automatically modify the rotating magnetic field based on a detected characteristic (e.g., clarity of the liquid sample).

The individual can then conduct a biochemical test (step 606). In some embodiments the biochemical test is conducted while the liquid sample is being agitated, while in other embodiments the biochemical test is conducted after the liquid sample has been agitated.

Unless contrary to physical possibility, it is envisioned that the steps described above may be performed in various sequences and combinations. For example, the liquid sample may be deposited into the well before the rotor is installed within the well. As another example, the liquid sample may be agitated on a periodic basis due to periodic generation of the rotating magnetic field.

Moreover, multiple instances of the same step may be performed simultaneously or successively. For instance, if the plate is in a standard 96-well format, liquid samples could be deposited into any number of the 96 wells. Similarly, rotors could be installed within any number of the 96 wells. For example, cylindrical rotors may only be installed within a subset of the wells that include liquid samples.

REMARKS

The foregoing description of various embodiments of the technology has been provided for the purposes of illustration and description. It is not intended to be exhaustive or to limit the claimed subject matter to the precise forms disclosed.

Many modifications and variation will be apparent to those skilled in the art. Embodiments were chosen and described in order to best describe the principles of the technology and its practical applications, thereby enabling others skilled in the relevant art to understand the claimed subject matter, the various embodiments, and the various modifications that are suited to the particular uses contemplated.

What is claimed is:

1. A system comprising:

a plate that includes one or more wells, each of which has a diameter of no more than 20 millimeters (mm) and a depth of no more than 20 mm;

a rotor that has a substantially cylindrical structural body with an open top end, an outer wall, and an inner wall disposed circumferentially around a central cavity, wherein the substantially cylindrical structural body is comprised of a ferromagnetic material, such that when the rotor is placed in a given well of the one or more wells and subjected to a rotating magnetic field, the rotor causes agitation throughout a liquid column formed by a sample in the given well; and a probe that is coated with analyte-binding molecules along one end that interact with analyte molecules in the sample during a biochemical test, wherein the open top end enables the probe to be suspended into the central cavity of the rotor during the biochemical test.

2. The system of claim 1, wherein a height of the substantially cylindrical structural body is at least 10 percent smaller than the depth of the one or more wells.

3. The system of claim 2, wherein the height of the substantially cylindrical structural body is at least 25 percent smaller than the depth of the one or more wells.

4. The system of claim 1, wherein the substantially cylindrical structural body has an open bottom end through which light is shone during a biochemical test.

5. The system of claim 1, wherein a diameter of the substantially cylindrical structural body is 15-19 millimeters, or 10-13.3 millimeters, or 5-9.1 millimeters.

6. The system of claim 1, wherein the plate includes a linear array of wells.

7. The system of claim 1, wherein the plate includes a circular array of wells.

8. The system of claim 1, wherein the plate includes at least two columns of wells and at least two rows of wells that define a rectangular matrix of wells.

9. The system of claim 1, wherein when the rotor is placed into the given well, an axis defined through the central cavity is orthogonal to a surface of the sample such that the open top end is proximate to an opening of the given well.

10. The system of claim 1, wherein the substantially cylindrical structural body is in a spiral form.

11. The system of claim 1, wherein agitation of the sample is variable during the biochemical test by changing a rotation speed of the rotating magnetic field.

12. The system of claim 1, wherein the ferromagnetic material is cobalt, iron, a ferromagnetic alloy, a plastic ferromagnetic composite material, or any combination thereof.

13. The system of claim 1, wherein the substantially cylindrical structural body includes one or more flow interfaces extending from the outer wall to the inner wall, the one or more flow interfaces enabling the sample to flow into the central cavity.

14. The system of claim 1, wherein the substantially cylindrical structural body further includes an open bottom end through which imaging light is shone during the biochemical test.

15. A method of agitating a sample using the system of claim 1, the method comprising:

placing the rotor in the given well that includes the sample; and applying a rotating magnetic field to rotate the rotor, thereby agitating the sample in the given well.

16. The method of claim 15, wherein the rotor is comprised of a ferromagnetic material and at least one other material.

17. The method of claim 15, further comprising:

during a biochemical test, varying rotational speed, direction, or orientation of the rotating magnetic field to vary an extent of agitation of the sample.

* * * * *